United States Patent [19]

Regan et al.

[11] Patent Number: 5,700,611
[45] Date of Patent: Dec. 23, 1997

[54] METHOD FOR FORMING OVERLAPPING TONER IMAGES

[75] Inventors: Michael T. Regan, Fairport; Peter S. Alexandrovich, Rochester, both of N.Y.

[73] Assignee: Eastman Kodak Company, Rochester, N.Y.

[21] Appl. No.: 568,772

[22] Filed: Dec. 7, 1995

[51] Int. Cl.$^6$ ............................................. G03G 13/01
[52] U.S. Cl. ............................................................ 430/45
[58] Field of Search ............................................ 430/45, 44

[56] References Cited

U.S. PATENT DOCUMENTS

| | | | |
|---|---|---|---|
| 3,775,106 | 11/1973 | Tamal et al. | 96/1.2 |
| 4,599,285 | 7/1986 | Haneda et al. | 430/54 |
| 4,600,669 | 7/1986 | Ng et al. | 430/47 |
| 4,629,669 | 12/1986 | Shoji et al. | 430/47 |
| 4,680,625 | 7/1987 | Shoji et al. | 358/80 |
| 4,708,459 | 11/1987 | Cowan et al. | 355/4 |
| 5,002,028 | 3/1991 | Mosehauer et al. | 430/45 |
| 5,194,351 | 3/1993 | Roller | 430/45 |
| 5,270,138 | 12/1993 | Kaneko et al. | 430/45 |

FOREIGN PATENT DOCUMENTS

| | | |
|---|---|---|
| 0 240 888 | 10/1987 | European Pat. Off. . |
| 0 625 730 | 11/1994 | European Pat. Off. . |

*Primary Examiner*—John Goodrow
*Attorney, Agent, or Firm*—Norman Rushefsky

[57] ABSTRACT

First and second toner images (usually of different color) are formed which at least partially overlap. The first toner image is crated by electronically exposing, pixel-by-pixel, a uniformly charged image member, to create a first electrostatic image and toning that image with toner of a first color. A second electrostatic image is formed by electronically exposing the image member according to a second electronic signal. The exposure of each pixel in the second exposure is adjusted to compensate for a change in electric field caused by any presence of toner from the first exposure in that pixel. The second electrostatic image is toned by toner of a second color to create a multicolor image with portions that overlap.

14 Claims, 6 Drawing Sheets

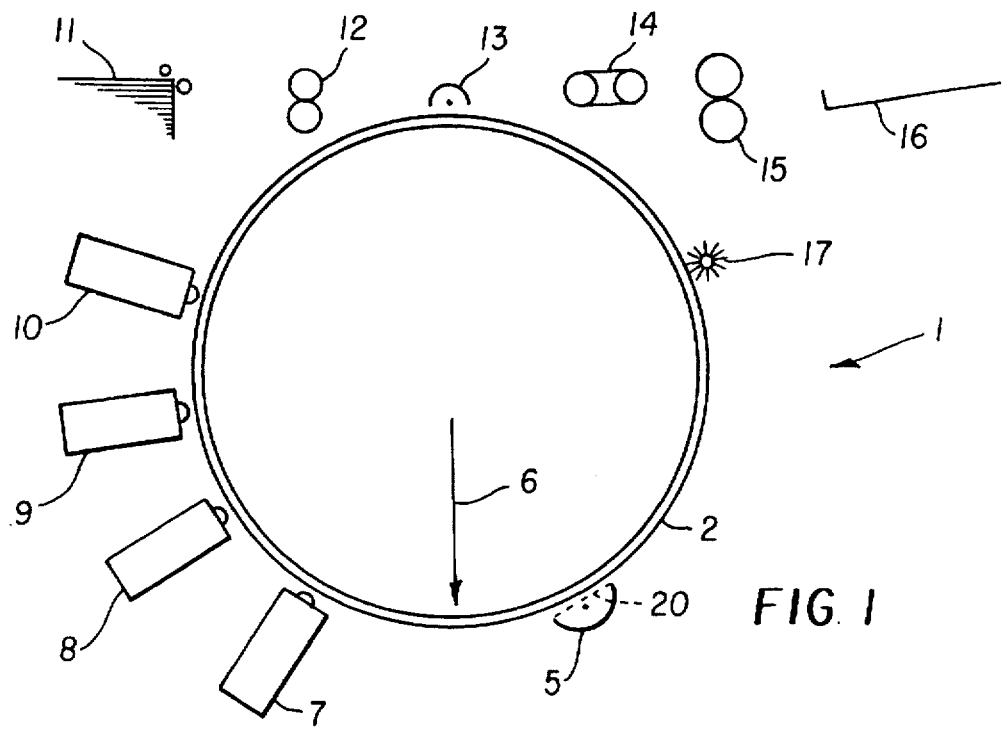
FIG. 1
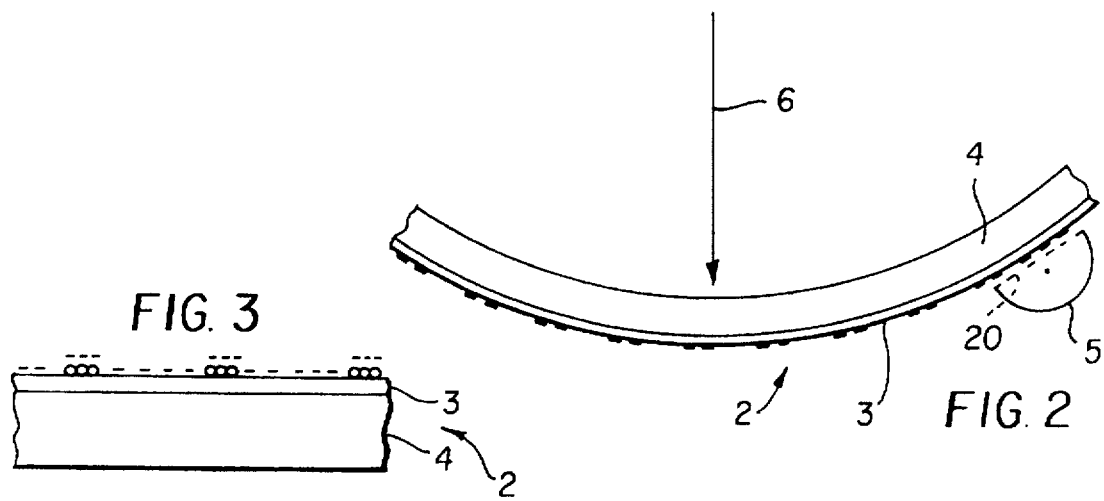
FIG. 3
FIG. 2
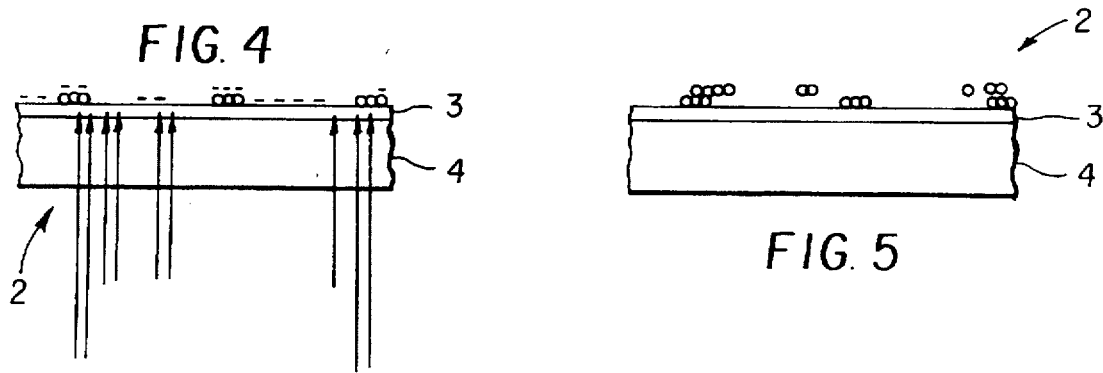
FIG. 4
FIG. 5

METHOD FOR FORMING OVERLAPPING TONER IMAGES

This invention relates to the formation of overlapping toner images. Although not limited thereto, it is particularly usable in forming multicolor toner images.

U.S. Pat. No. 5,001,028, Mosehauer et al, issued Mar. 19, 1991; U.S. Pat. No. 4,629,669, to Shoji et al, issued Dec. 16, 1986; European Patent Application 0240888; and U.S. Pat. No. 4,599,285 to Haneda et al, issued Jul. 8, 1986, are representative of a number of references which disclose a process in which two or more color toner images are formed on the same frame of a photoconductive member. As disclosed, the photoconductive member is uniformly charged, imagewise exposed, and the exposed areas developed with a toner of a first color. With the unfixed toner electrostatically adhering to the exposed areas, the photoconductive member is exposed to a second image that does not overlap with the first image. That image is then developed by application of a second color toner to the newly exposed areas. The process can be repeated for more colors. The resulting multicolor image is transferred to a receiving sheet in one step.

This process doubles the speed of prior two-color processes in which separate images are made on separate frames and then transferred in registration. Further, the requirement of prior processes that image-to-image registration be controlled in transfer is eliminated since the multicolor image is transferred in a single step.

Some references (see U.S. Pat. No. 3,775,106) suggest that this process can be used both in charged area development (CAD) and discharged area development (DAD) processes and that full color reproductions can be made using cyan, magenta and yellow toners. However, most discussions of this type of system suggest that it is best adapted to non-overlapping images which are toned using discharged area development because of difficulties in both discharging and toning with a new image, areas that already contain toner from a prior image.

U.S. Pat. No. 4,680,625, Shoji et al, issued Jul. 14, 1987, suggests a super pixel approach to the problem which, of course, does not involve overlapping but will give the appearance of overlapping. Unfortunately, super pixels greatly reduce the resolution and the levels of toner available, using up most of the resolution of the system in producing the correct hue for each super pixel. This latter patent also suggests a black toner station in addition to the cyan, magenta and yellow stations, enabling the use of undercolor removal to save toner, a system well known in the printing art and presently used in some color electrophotographic systems.

U.S. Pat. No. 4,600,669, to Contois et al, issued Jul. 15, 1986, describes a system in which a charged photoconductor is optically (non-electronically) exposed through its base to a color separation of an original and developed with a liquid developer to form a toner image. After the image is dried, the photoconductor and image are recharged, exposed through the base and developed with a second color image. The process is repeated with third and fourth colors. This process is presently used in a high quality color proofing apparatus for the printing industry. Because exposure is through the base, the earlier images do not interfere with the amount of exposure. Quality results are obtained with this liquid development based system. See also, U.S. Pat. No. 4,708,459 to Cowan et al, issued Nov. 24, 1987.

Other methods have been suggested for overcoming the problem of exposing second and subsequent images despite the presence of one or more toner images in some of the areas to be exposed. U.S. Pat. No. 4,725,867, issued Feb. 16, 1988 to Ng et al, suggests using an infrared laser having a wavelength to which the toner already in place is transparent. This system has been successfully used with thin liquid toners, but it requires that all toners used (except the last one) be transparent at the exposure wavelength. This somewhat limits the choice of toners.

Unfortunately, the results of the liquid systems have not been repeatable in single frame color systems in which development is with conventional dry toners. The previous toner image appears to have a substantial affect on subsequent images. It would be desirable to overlap images in dry systems and not require using a "super-pixel" approach for color variation.

The European Pat. Application 94-107101.1, published Nov. 23, 1984 (Publication No. 0 625 730), suggests an overlapping second exposure through the base in a DAD system to prevent movement of a dry first toner image into an adjoining second exposure. In this instance, some overlapping of images is tolerated, but actual mixing of toner is not intended and certainly not done to provide a variation in color.

SUMMARY OF THE INVENTION

It is an object of the invention to provide a method and apparatus for forming a multicolor toner image substantially as described above but with color controlled and varied by overlapping toner images, in which the problems described associated with such overlapping toner images are greatly reduced.

The toner layer of the prior toner image is composed of charged particles; this "space charge" layer has a surface potential associated with it that is proportional to both the amount of the charge and the capacitance of the layer. Thus, the electric field that subsequent toning processes experience in overlapping areas is modified from that of non-overlapping areas. For consecutive discharged area development (DAD) toning processes, this modification represents a reduction in the available electric field for subsequent toning in areas overlapping a prior image relative to non-overlapping areas. For consecutive charged area development (CAD) toning processes, the primary photoreceptor charging step of the subsequent process will result in a reversal of the polarity of the prior toner layer to that of the primary charge. The space charge related modification to the subsequent step latent image in this case represents an increase in the electric field available for toning in overlapping areas relative to non-overlapping areas.

According to the invention, in either case, extra exposure during subsequent imaging steps in the overlapping areas can be used to correct the available field to the appropriate value. In an electronic system with good image-to-image exposure registration, this modified electric field can be compensated for by increasing exposure pixel-by-pixel according to the amount of exposure used in creating the prior image.

Although the invention can be used with liquid toners, with submicron sized toners used in liquid development, the space charge layer is very thin and, thus, of high capacitance. A given amount of space charge will result in a much lower surface potential for such a layer than for the relatively thick, low capacitance layers associated with dry toners which are typically in the 5 to 15 micron size range. Overlapping multicolor toning processes are, thus, fundamentally less susceptible to space charge related interactions between layers as toner particle size is substantially decreased. For this reason, the invention has much greater application to systems using dry development. However, it can be used with both DAD and CAD systems.

According to a preferred embodiment of the invention, a first toner image is formed on a conventional electrophotosensitive element from an electrostatic image formed by an electronic printhead driven by a first electronic signal which is representative of the desired first toner image. A second electronic signal representative of the exposure that would be required to create a second electrostatic image if there were no first toner image is combined with the first signal. This combination is done according to an empirically derived formula or a look-up table, or the like, which adjusts the second exposure, pixel-by-pixel, to compensate for changes in the electric field of the second latent image caused by the first toner image.

Not only is the invention usable in single bit exposure systems in which the laser, LED printhead or the like, only has "ON" and "OFF" conditions, but it is particularly usable in gray scale "imaging systems" in which any or each exposure has more than one level of exposure available to it.

BRIEF DESCRIPTION OF THE DRAWINGS

In the detailed description of the preferred embodiment of the invention presented below, reference is made to the accompanying drawings, in which:

FIGS. 1 and 10 are side schematics of alternative image forming apparatus.

FIG. 2 is an enlarged section of a portion of the apparatus shown in FIG. 1.

FIGS. 3, 4 and 5 are a series of schematics illustrating a portion of an image forming method.

DETAILED DESCRIPTION OF THE INVENTION

Figure 6:
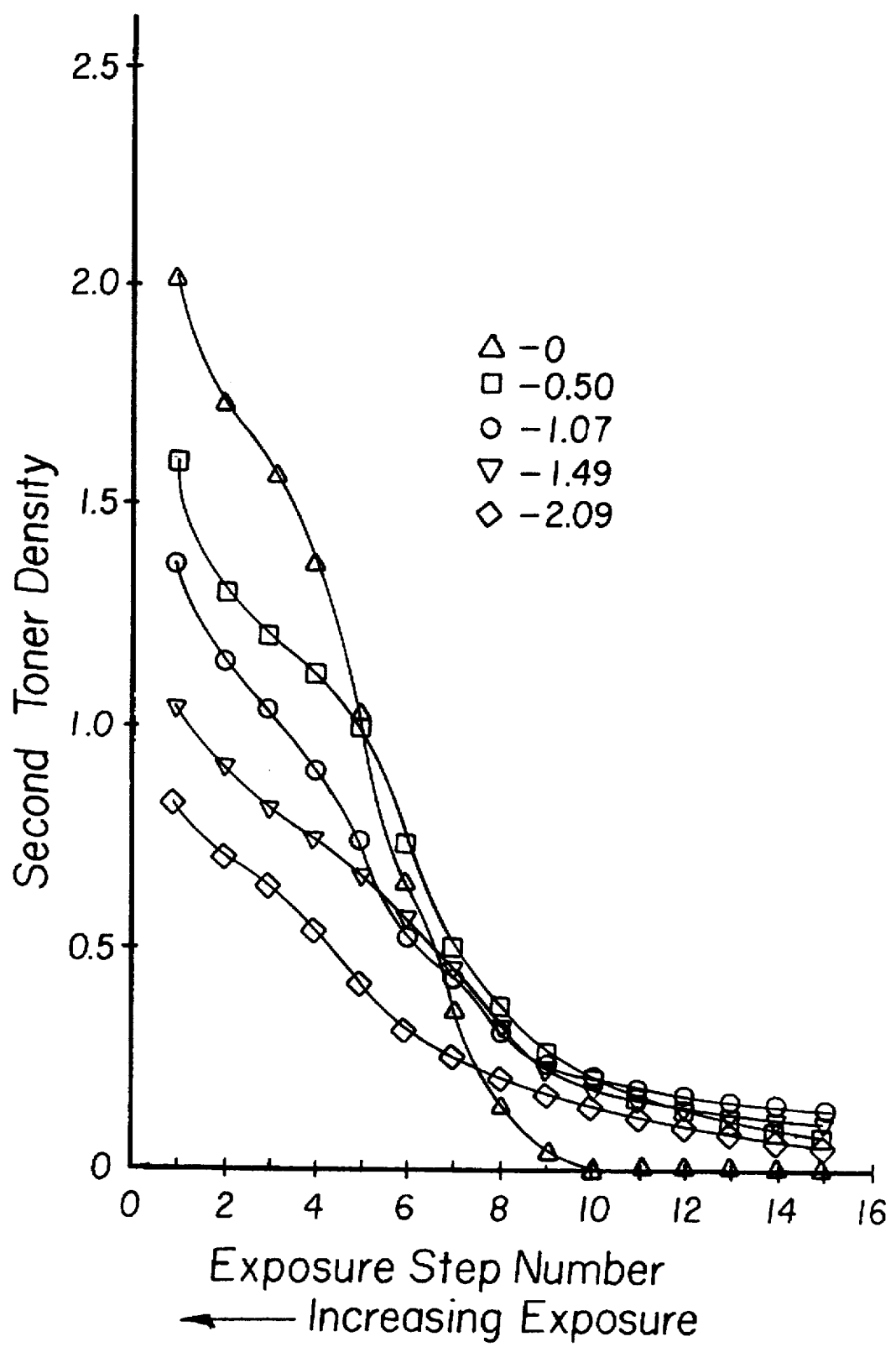
FIG. 6 is a graphic representation of data for a two-color overlapping imaging method illustrating reduction in density of the second toning step caused by the space charge of the first toner.

According to FIGS. 1 and 2, a multicolor image forming apparatus 1 includes an image member, for example, an electrophotosensitive element 2 which, in the FIGS. 1 and 2 embodiment, is in the form of a drum. Image member 2, as seen in FIG. 2, is made up of a transparent base 4, which may be glass or another transparent material and a series of electrophotosensitive layers 3 which make up a typical imaging member or element in electrophotography. The electrophotosensitive layers 3 generally include at least a grounded transparent conductive layer in contact with or near the base 4 and one or more photoconductive layers, charge transport layers, barrier layers and insulating layers, all of which are well known in the art.

In forming a first toner image on image member 2, it is first uniformly charged at a charging station 5 and then exposed to imagewise radiation at an exposure station 6 to create a first electrostatic image according to the imagewise radiation. As shown in the FIGS., exposure station 6 is preferably an electronic exposure station, for example, a laser, LED printhead, or the like. Because exposure is made through the base 4, base 4 must be transparent to the wavelength of the radiation of exposure station 6. It need not be transparent to any other radiation and, in fact, may be opaque to visible light.

The first electrostatic image formed by stations 5 and 6 is toned by the application of toner of a first color to form a first toner image also of the first color. For example, the first electrostatic image may be toned by the application of black toner at a black toning station 10. Because black toning station 10 forms the first toner image, virtually any toning mechanism can be used, for example, an ordinary two component magnetic brush.

With the loose toner image from black toner station 10 on image member 2, image member 2 rotates again past charging station 5 where a uniform charge is again applied. Since substantial charge remains on the surface of image member 2 and may vary in level between areas that have been toned and not toned, charger 5 includes a grid 20 preferably to bring the entire surface of image member 2 to a uniform charge.

Image member 2 is again exposed by exposure station 6 to imagewise radiation to create a second electrostatic image. The second electrostatic image is toned by application of toner of a second color, different from the first color, at toning station 9. For example, a cyan toner image may be formed.

The process is repeated with third and fourth colors, for example, magenta and yellow, using toning stations 8 and 7 to form a four-color toner image. At this point, a receiving sheet is fed from receiving sheet supply 11 through timing rollers 12 and a transfer station 13. The four-color multicolor image is transferred in one step to the receiving sheet at transfer station 13. The receiving sheet is separated from image member 2 and transported by transport mechanism 14 to a fuser 15 where it is fixed and then fed into an output hopper 16. The image member is then cleaned by a cleaning station 17 which is articulated into cleaning position by means not shown after the transfer step. Note that both the transfer step and the cleaning step are carried out only every fourth revolution of image member 2.

If image member 2 were exposed from the side carrying the electrophotosensitive layers 3, second and subsequent exposures must contend directly with absorption of radiation by toner. This problem is best shown in FIG. 2 where toner is illustrated on the surface of image member 2. This problem of radiation absorption is reduced by exposure through the base 4 utilizing light from a laser or other source to which base 4 is transparent. Alternatively, image member 2 could be exposed from the image side using exposing radiation (for example, an infrared laser) to which the toner is transparent. This alternative has the disadvantage of limiting the toners that can be used.

A second problem created by the presence of toner during an exposure step is that the surface potential of the toner-electrophotosensitive layer-conductive layer combination is different than that of the untoned electrophotosensitive layers. Further, that surface potential varies with the amount of toner at any particular spot. The result is that the electric field of the subsequent latent image seen by the subsequent toning station is affected by the amount of toner present from the previous image or images. If exposure at exposure station 6 is accomplished by an electronic exposure device which creates an image by exposing an image area pixel-by-pixel, this effect can be reduced by adjusting subsequent exposures according to the change in electric field due to the first image toner associated with that individual pixel.

This is illustrated in coarse terms in FIGS. 3, 4 and 5 for a discharged area development (DAD) process. According to FIG. 3, image member 2 is shown with the first toner image in place and after it has been uniformly charged by charging station 5 to prepare for second image formation. According to FIG. 4, the second electrostatic image is formed by exposure to imagewise radiation having two image levels. Pixels which received toner in the first image formation and are to be toned in the second image are given a higher level of radiation than pixels without such toner. This is because the reduced electric field caused by the space charge associated with the toner requires additional exposure to discharge. In the relatively simple two level approach shown in FIGS. 3, 4 and 5, the second electrostatic image created in FIG. 4 is then toned, forming a second toner image in some cases overlapping the first toner image as shown in FIG. 5. For purposes of clarity, the second toner image is shown at a uniform distance from the surface of layers 3, whether or not the first toner image is present. Obviously, in actual practice, the toner adheres to either the toner or the surface of layers 3 and would not be a uniform distance from layers 3.

Formation of third and fourth toner images utilizes the same principles as that illustrated in FIGS. 3–5. However, some areas would have only a single layer of toner. Other areas would have two layers of toner and others no toner. Thus, to create the third electrostatic image, a three level exposing device is preferred, and to create the fourth electrostatic image, a four level exposing device is preferred. If earlier toner images create different electric field effects, more levels may be preferred for complete uniformity of subsequent images.

In the example shown in FIGS. 3–5 a single level of density is created for each image. This rather coarse example can create images with a variation of toners only using a super pixel approach. The invention would contribute the advantage of allowing the different colors to be superposed for each pixel, thereby saving space and increasing resolution.

However, the invention provides far greater flexibility and resolution in a continuous or multiple tone application. More specifically, using a printhead that is continuously variable or has multiple levels of intensity that approximate continuous variability, a desired variable density in a second image can be produced over a variable density first image, pixel-by-pixel. This utilizes the same principles as those utilized to obtain the results illustrated in FIGS. 3–5. The programming, of course, is far more extensive. Each pixel receives a variable amount of toner of each color, and, therefore, the amount of adjustment for subsequent exposure of that pixel must also vary. Although this variance is not generally linear, it is capable of being experimentally determined by a person skilled in the art.

Figure 7:
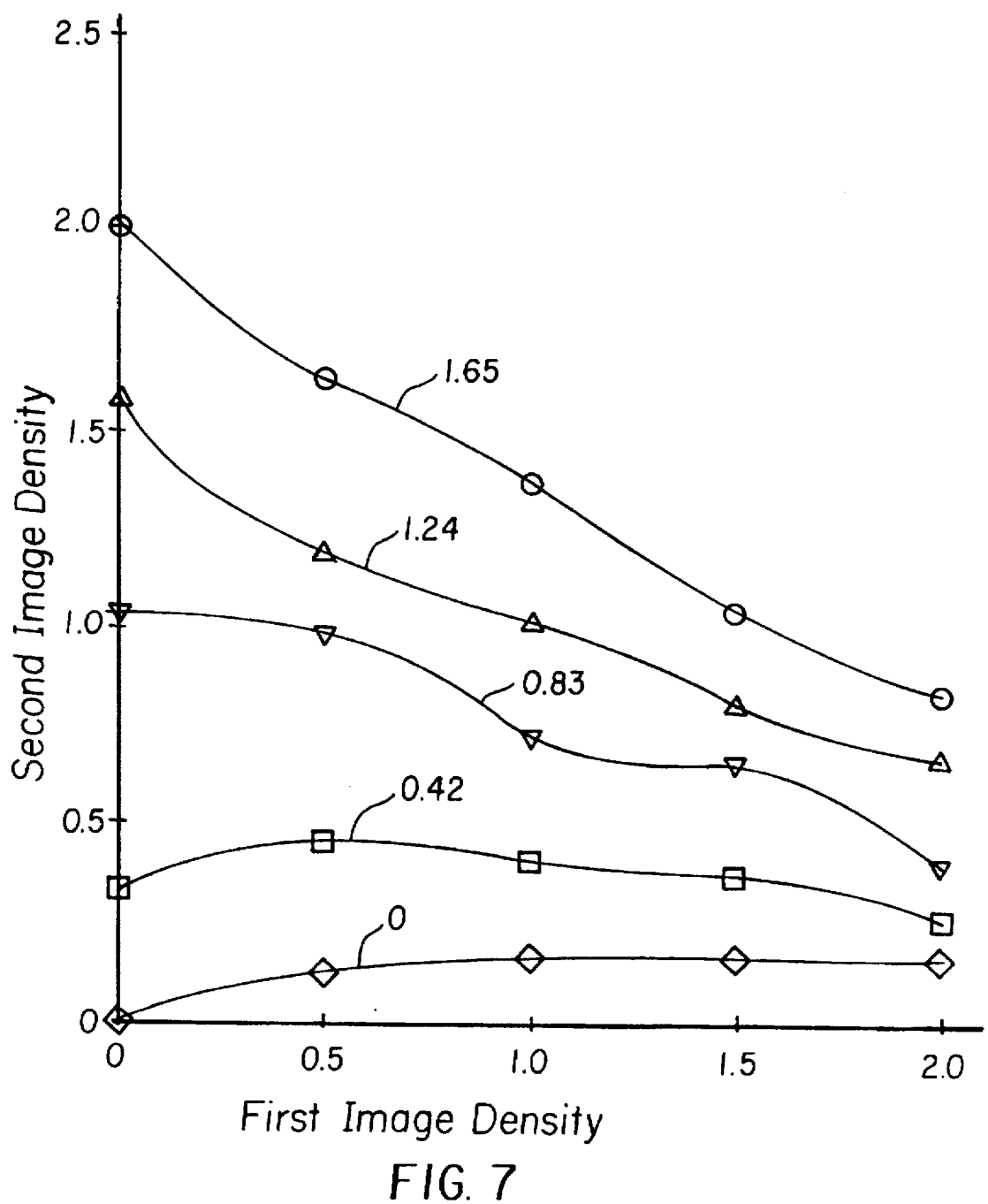
FIG. 7 is another way to represent the data of FIG. 6 that illustrates one method of constructing a look-up table.

FIGS. 6 and 7 are different graphical representations of the same data. Five levels of exposure were used to obtain five densities of a first toner on a conventional organic photoconductor having a transparent polyester base. For ease in measuring densities, the first toner was a conventional blue styrene-acrylic toner having a mean particle size between 8 and 15 microns. The five densities were 0, 0.50, 1.07, 1.49 and 2.02. The toners are not fused. The same element was recharged and exposed through the base to activating radiation varied by a wedge having 16 steps. Each level of the first image was given a full range of exposure. The resulting electrostatic image was toned with a red styrene-acrylic toner having a mean particle size between 8 and 15 microns by a two component magnetic brush having a rotating core and using hard magnetic carrier particles. The toner and electrostatic image were charged to the same polarity, so the resulting densities for both images were greater in the most exposed areas (a DAD process).

FIG. 6 shows substantial decreases in density at high second exposures according to the density of the first image. This phenomena appears to persist through exposure step 6 where it is overcome by other factors in the test. The particular contact toning process used to develop the second latent image exhibited replacement of the fast toner by the second at low second image exposures. This latter problem, called "overtoning," is a toning problem that varies according to the development process used. The lower densities in the higher exposures is the result of a reduction in electric field caused by space charge on the first toner and is correctable using the invention.

FIG. 7 is based upon the same data as FIG. 6. In FIG. 7, second image density is plotted against first image density for various exposures of the second image. This graph is usable to prepare a look-up table to determine the second exposure based upon the density of the first image. For example, referring to FIG. 7, if, for a particular pixel, a density of 1.0 is desired of a second toner over a first toner having a density of 1.0, the log exposure for that should be slightly less than 1.24. However, for the same 1.0 desired density in the second image where the first image is 0.0, the second log exposure need be only slightly more than 0.83.

The overtoning shown at low densities can be ignored and the look-up table extrapolated from the higher density results. However, this is less exact. Preferably, the toning method used would be picked to not exhibit overtoning over the range of densities the process is asked to operate, e.g., the first six exposure steps of FIG. 6 with this particular magnetic brush.

Figure 8:
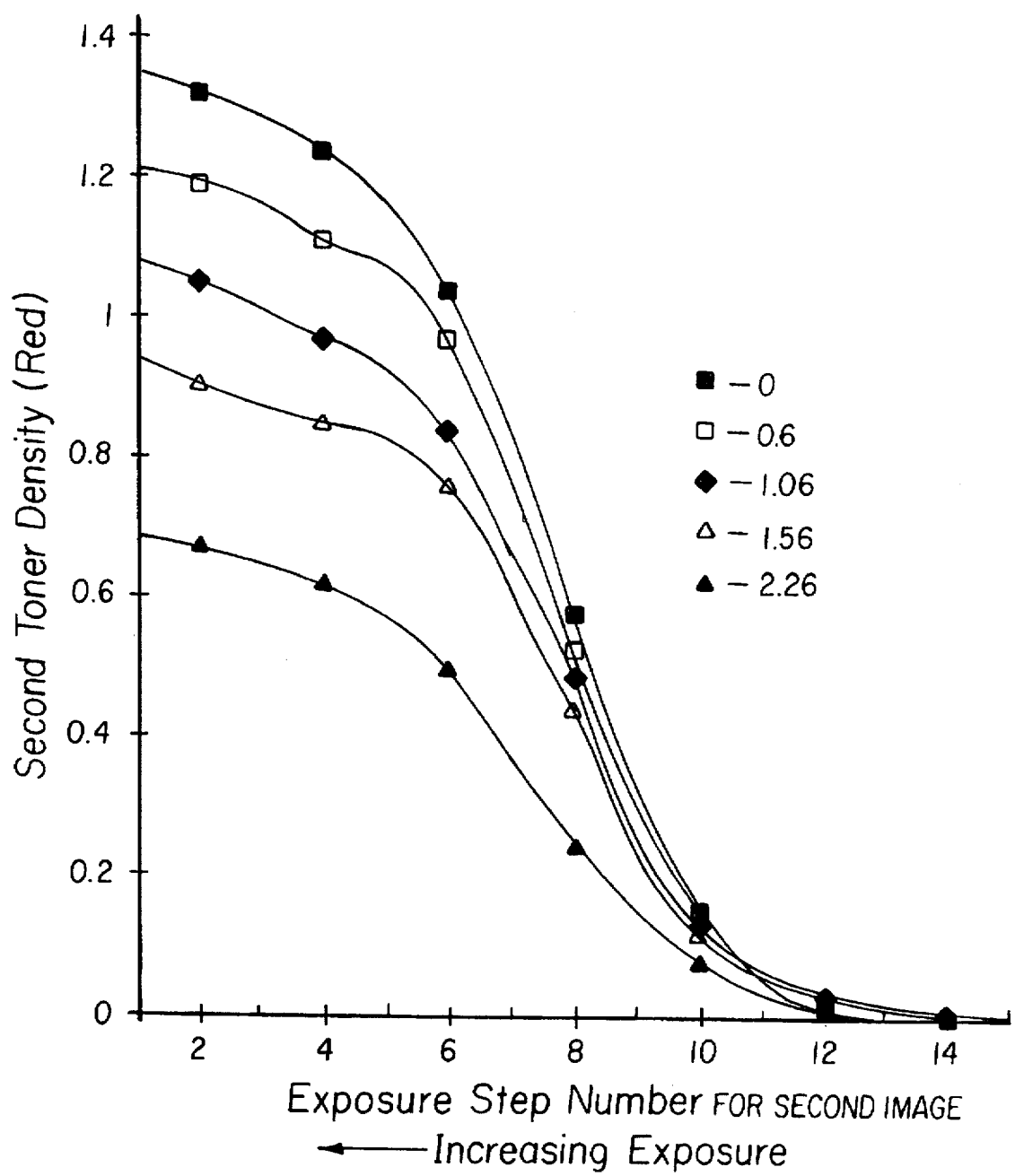
FIG. 8 is a graphic illustration of data for a two-color overlapping process where the second development step is a projection toning method.

FIG. 8 illustrates the results of conducting a two-color process like that of FIGS. 6 and 7, except where the second development step is now a non-contacting variety, and the overtoning phenomena does not occur. Uniform patches of the same blue toner used in FIG. 6 were prepared on the same type of organic photoreceptor used in FIG. 6, at transmission densities of 0, 0.6, 1.06, 1.56 and 2.26. The toners were not fused. The element was recharged and exposed through the base to activating radiation varied by a wedge having 16 steps. Each of the five first images was given the full range of second exposure. The resulting latent images were toned with a discharge area development process using the same red two component developer and the same rotating core brush as in FIG. 6. The spacing from the toning shell to the photoreceptor was, however, increased from that used in FIG. 6 such that contact of the chains of second developer with the first toner deposits was eliminated. In addition, a 1.5 kHz, 3 kV peak-to-peak square waveform AC electric field was applied to the toning shell to enhance the rate of development. This "projection toning" process did not exhibit the overtoning observed in FIG. 6 at step 6 and higher, and did result in a somewhat different curve shape than that of FIG. 6. It is seen that there is a substantial decrease in second image density according to the density of the first image. The lower densities are the results of a reduction in the electric field of the second latent image by the space charge of the first toner, and are correctable by adjusting the second exposure using this invention.

It should be noted that for preferred practice of the invention, the density forming ability of the second and subsequent toning steps preferably are such that the desired Dmax is achieved without having to use the full available exposure in non-overlapping areas. Second and subsequent toning processes that do not disturb the previous unfused images in any manner such as disruption of the previous image, scavenging of the previous image, or overtoning of the previous image are preferred. Thus, projection toning processes are preferred. FIGS. 6 and 7 are not prepared with such optimized toning processes, but, however, do illustrate the ability to correct for the effects of the space charge of a prior toner layer by increasing the exposure of a subsequent imaging step in overlapping areas.

Figure 9:
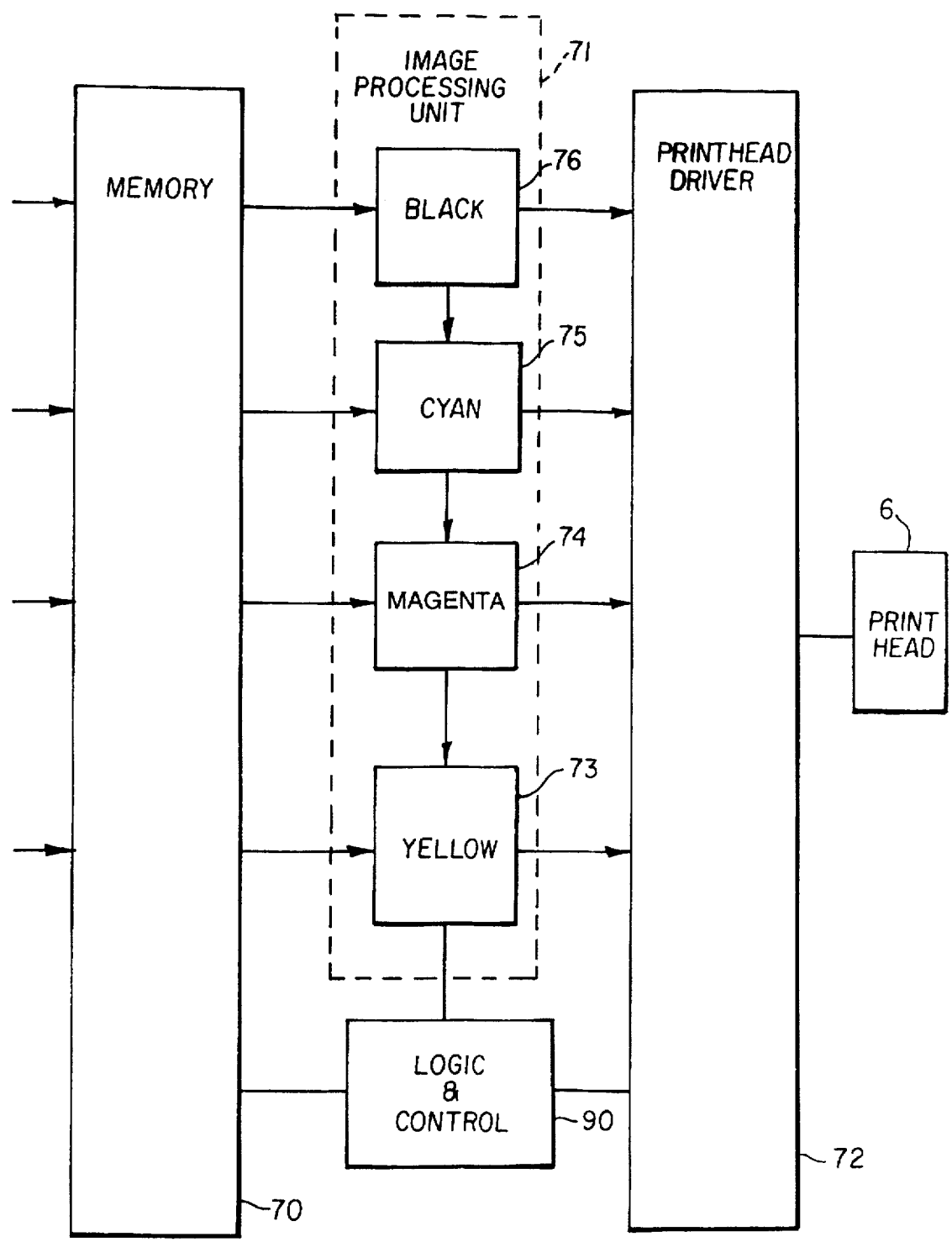
FIG. 9 is a schematic circuit diagram illustrating the electronic components for carrying out a preferred embodiment of the invention.

FIG. 9 illustrates the circuitry required to accomplish the result illustrated, in part, in FIGS. 3–5. According to FIG. 9, electronic signals representative of desired color densities for each of the four color separations are received and stored in a memory 70. These signals may come from a computer work station, another memory, or a color scanner. A logic and control 90 accesses the memory and feeds the signals representing each color separation to separate portions of an image processing unit 71. The image processing unit 71 can be conveniently broken down into yellow, magenta, cyan and black portions 73, 74, 75 and 76, respectively. The signal representing the black image at this point is fed into the black image processing portion 76 where it is processed to the extent necessary and then fed to a printhead driver which, in turn, controls laser or LED printhead 6. The same signal fed to the printhead driver is also fed to the cyan image processing portion 75 which also receives the cyan image signal from memory 70. These two signals are combined, using a look-up table or a formula derived from graphs in FIGS. 6, 7 and 8, to create a composite image signal which adjusts for the change in exposure that will be necessary to compensate for the change in electric field due to the presence of black toner in any given pixel. The resultant signal, along with whatever other image processing is done in portion 75 is then fed to printhead driver 72. The same general procedure is carried out in portions 74 and 73 for magenta and yellow images, in each instance combining signals representing colors to be formed prior to the image in question. The printhead driven controls exposure station 6 for use in the FIG. 1 apparatus.

Figure 10:
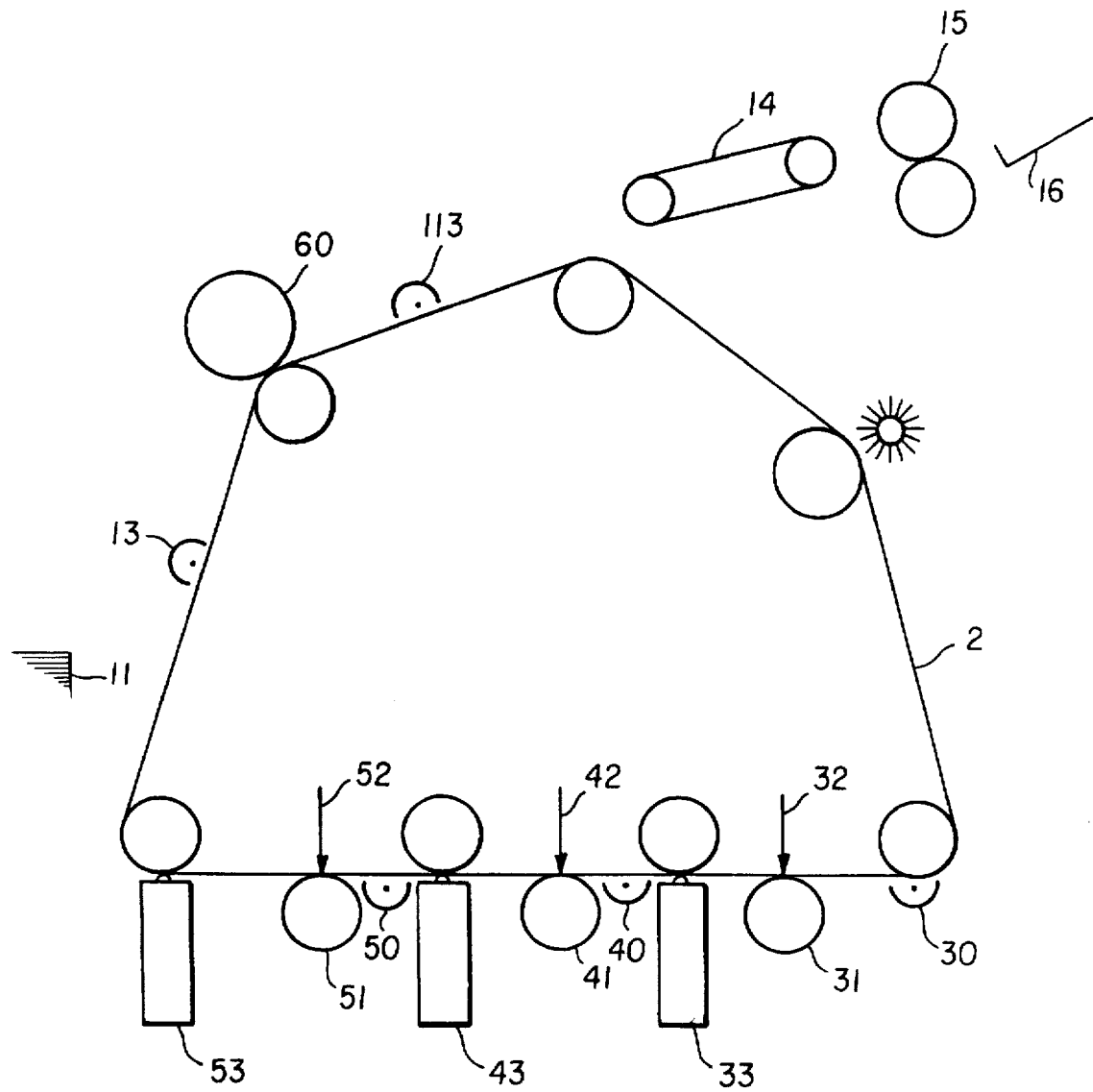

FIG. 10 shows an alternative apparatus for carrying out the invention in which exposure is accomplished by three different exposure stations 32, 42 and 52 after charging at different charging stations 30, 40 and 50. Image member 2 is now an endless belt and exposure stations are backed by exposure station rollers 31, 41 and 51. Toning stations 33, 43 and 53 apply cyan, magenta and yellow toner, respectively, to create three-color toner images.

The apparatus shown in FIG. 10 can make duplex color prints by transferring a first multicolor image at transfer station 3, turning the receiving sheet over at a turnover station 60 and transferring a second multicolor image at a second transfer station 113 to the opposite side.

This apparatus functions substantially the same as the apparatus in FIGS. 1 and 2 in carrying out the invention. However, it has the advantage over the FIGS. 1–2 apparatus of being able to form a three-color image at full machine speed while the FIGS. 1–2 apparatus requires a complete revolution for each color. It also has the advantage of doing multicolor duplex, a problem which is quite challenging without excessive use of a fuser. The apparatus shown in FIG. 10 is similar to apparatus shown and described in U.S. Pat. No. 5,001,028, mentioned above. Note that exposure station 32 need not be positioned behind the image member 2, since there is no prior image blocking its exposure.

Despite the speed and flexibility of the FIG. 10 apparatus, for most applications the FIGS. 1–2 apparatus is preferred. This is because the use of a single exposure station and a drum photoconductor make exposure registration, pixel-by-pixel, much easier to accomplish.

The invention has been described using conventional subtractive colors, cyan, magenta and yellow. However, it can also be used in an accent color application with other colors that provide a desirable accent color when mixed in the appropriate proportions. It can also be used with two different toners of the same color, for example, magnetic and non-magnetic black toners.

The specific examples were carried out using DAD— DAD processes. Similar considerations apply in CAD— CAD; CAD—DAD and DAD—CAD. That is, the electric field associated with prior images affects the density of later images that overlap. According to the invention, these can also be compensated for with a change in exposure.

The invention has been described in detail with particular reference to a preferred embodiment thereof, but it will be understood that variations and modifications can be effected within the spirit and scope of the invention as described hereinabove and as defined in the appended claims.

We claim:

1. A method of forming a combined toner image comprising:

a. uniformly charging an image surface of an imaging member, which imaging member includes at least one photoelectrically sensitive layer, b. exposing said photoelectrically sensitive layer to radiation according to first image information to form a first electrostatic image, with first pixels of more than two different charge levels, c. applying a first electrostatically charged dry toner to said electrostatic image to create a first toner image of varying density on said image surface, exposing said photoelectrically sensitive layer from a side of said layer opposite the image surface to radiation according to second image information to form a second electrostatic image with second pixels of more than two different charge levels, and e. applying a second electrostatically charged dry toner to said second electrostatic image to form a second toner image of varying density, which first and second toner images overlap to form a combined toner image of varying density, wherein in step d, exposures for forming said second electrostatic image overlaps with the first toner image and the amount of exposure for second pixels is adjusted in response to first image information regarding respective density of first pixels to improve development of the second toner image and offset the affects of space charge of the first toner image in development of the second toner image.

2. The method according to claim 1 wherein said first and second exposing steps are carried out by an electronic exposing device that exposes the images in a series of pixels in response to first and second electrical signals, respectively, and wherein said adjusting step includes adjusting the second electrical signal according to the first electrical signal to adjust the intensity of the exposure of each pixel in creating the second electrostatic image according to the exposure of that pixel in creating the first electrostatic image.

3. The method according to claim 2 wherein said imaging member includes a base which is transparent to radiation and at least the second of said exposure steps is made through said base.

4. The method according to claim 1 wherein the first and second toners are of different color and the combined toner image is a multicolor image.

5. The method according to claim 1 further including, after creating the first toner image and before creating the second electrostatic image, the step of uniformly recharging the image surface to a charge of the same polarity as that of the first electrostatic image.

6. The method according to claim 5 wherein the steps of recharging, exposing and applying are repeated to form a third toner image, with the first, second and third toner images forming a combined toner image.

7. A method of forming a multicolor toner image, said method comprising:

uniformly charging an electrophotosensitive element, first exposing said charged element pixel-by-pixel to imagewise radiation according to a first electronic signal representative of a desired first image density to form a first electrostatic image, developing said first electrostatic image by applying toner of a first color to said image to form a first toner image of said first color, second exposing said element pixel-by-pixel to imagewise radiation according to a second electronic signal to form a second electrostatic image, said second electronic signal being a function of an electronic signal representing the desired density for a second toner image and an adjustment, pixel-by-pixel, to that signal based upon the first electronic signal for the change in electric field of the element caused by the first toner image, and developing said second electrostatic image with toner of a second color to form a multicolor image;

wherein in said first exposing step said first electronic signal represents a plurality of density levels above zero density and in said second exposing step said adjustment is varied according to each of the plurality of density levels represented in the first electronic signal.

8. The method according to claim 7 wherein said electrophotosensitive element is in the shape of a drum and is rotatable past a series of stations to form the multicolor image, and said exposing steps are accomplished by a single laser means located inside said drum and past which said element is rotated once for each toner image formed.

9. The method according to claim 7 wherein each of said toners and each of said electrostatic images are of the same polarity.

10. The method according to claim 7 wherein in the second exposing step, said second electronic signal represents a plurality of density levels in addition to a zero density and said adjustment is varied according to each of the plurality of density levels of both said first and second electronic signals.

11. The method according to claim 10 wherein said second exposing step includes accessing a look-up table which provides a proper exposure for each pixel as a function of the desired density of that pixel in each of said first and second toner images.

12. The method according to claim 7 wherein the first toner image is formed on a first side of the electrophotosensitive element and the second exposing step is carried out from the side opposite said first side.

13. The method according to claim 12 further including, after creation of the first toner image and before creating the second electrostatic image, the step of recharging the electrophotosensitive element to a charge of the same polarity as that of the first electrostatic image.

14. The method according to claim 13 wherein the steps of recharging, exposing and developing are repeated to form a third toner image with a third exposing step including exposing said element pixel-by-pixel to imagewise radiation according to a third electronic signal representing the desired density for the third toner image and adjustment, pixel-by-pixel, to that signal based upon the first and second electronic signals for the change in the electric field caused by the first and second toner images.

* * * * *